United States Patent
Tang et al.

(10) Patent No.: US 8,879,217 B2
(45) Date of Patent: Nov. 4, 2014

(54) SWITCHING REGULATOR WITH NEGATIVE CURRENT LIMIT PROTECTION

(75) Inventors: Benjamim Tang, Rancho Palos Verdes, CA (US); Amir Babazadeh, Irvine, CA (US)

(73) Assignee: Infineon Technologies Austria AG, Villach (AT)

( * ) Notice: Subject to any disclaimer, the term of this patent is extended or adjusted under 35 U.S.C. 154(b) by 95 days.

(21) Appl. No.: 13/537,907

(22) Filed: Jun. 29, 2012

(65) Prior Publication Data
US 2014/0002932 A1  Jan. 2, 2014

(51) Int. Cl.
H02H 3/22 (2006.01)

(52) U.S. Cl.
USPC ............................... 361/18; 361/111

(58) Field of Classification Search
USPC ..................................... 361/18, 111
See application file for complete search history.

(56) References Cited

U.S. PATENT DOCUMENTS

| | | | |
|---|---|---|---|
| 6,329,801 B1 | 12/2001 | Zuniga et al. | |
| 7,436,162 B2 | 10/2008 | Walters | |
| 7,705,579 B1 | 4/2010 | Hariman et al. | |
| 7,928,713 B2 | 4/2011 | Nguyen | |
| 2006/0164057 A1* | 7/2006 | Kudo et al. | 323/282 |
| 2006/0221528 A1* | 10/2006 | Li et al. | 361/100 |
| 2009/0121695 A1 | 5/2009 | Pierson et al. | |
| 2009/0146643 A1 | 6/2009 | Ostrom et al. | |
| 2010/0019748 A1 | 1/2010 | Kleine | |
| 2010/0315059 A1 | 12/2010 | Zhan | |
| 2011/0193543 A1 | 8/2011 | Nguyen | |
| 2011/0221414 A1* | 9/2011 | Pigott et al. | 323/283 |
| 2011/0241642 A1 | 10/2011 | Xi | |

OTHER PUBLICATIONS

"Low Duty Cycle, 600 mA, 3 MHz Synchronous Step-Down DC-to-DC Converter." Analog Devices, Inc., 2007. Norwood, MA.
"Dual 5 A, 20 V Synchronous Step-Down Regulator with Integrated High-Side MOSFET." Analog Devices, Inc., 2007. Norwood, MA.

* cited by examiner

Primary Examiner — Danny Nguyen
(74) Attorney, Agent, or Firm — Murphy, Bilak & Homiller, PLLC

(57) ABSTRACT

A switching regulator includes a power stage for coupling to a load through an inductor. The power stage switches so that the power stage sources positive current to the load through a first transistor of the power stage during some periods and sinks negative current from the load through a second transistor of the power stage during other periods. The switching regulator further includes a protection circuit operable to force the second transistor into an off-state state responsive to the negative current flowing through the inductor exceeding a predetermined negative threshold.

28 Claims, 6 Drawing Sheets

SWITCHING REGULATOR WITH NEGATIVE CURRENT LIMIT PROTECTION

FIELD OF TECHNOLOGY

The present application relates to switching regulators, in particular negative current limit protection for switching regulators.

BACKGROUND

Robust operation of switching regulators includes both positive current operation i.e. the power stage of the regulator sources (positive) current to the load and negative current operation i.e. the power stage of the regulator sinks (negative) current from the load. Most conventional switching regulators do not offer negative current operation and instead attempt to avoid negative current operation altogether. For example, operation in DCM (discontinuous conduction mode) can prevent negative current conduction. The low-side transistor of the regulator power stage typically has a negative dI/dt conduction response, meaning that current decreases while the low-side transistor is switched on. In DCM, the low-side transistor is switched off once the current reaches zero. Doing so prevents the current from becoming negative, which is undesirable for many applications due to the loss in efficiency from conduction losses incurred during negative current conduction. However, certain regulators must rely on negative current in order to improve the performance during dynamic operations such as load release (i.e. load current changing from a high value to a value near zero) or negative voltage transitions (i.e. voltage changing from a high value to a lower value requiring the regulator to discharge the output capacitor). This is particularly true of multiphase converters, where the current handling capability of each individual phase is only a fraction of the total current handling capability of the converter. Catastrophic failure of the power stage can occur when negative current exceeds the negative current handling capability of the power stage transistors.

SUMMARY

According to an embodiment of a method of current limit protection for a switching regulator, the method comprises: switching a power stage coupled to a load through an inductor so that the power stage sources positive current to the load through a first transistor of the power stage during some periods and sinks negative current from the load through a second transistor of the power stage during other periods; and forcing the second transistor into an off-state state responsive to the negative current flowing through the inductor exceeding a predetermined negative threshold.

According to an embodiment of a switching regulator, the switching regulator comprises a power stage for coupling to a load through an inductor and a current monitoring circuit. The power stage is operable to switch so that the power stage sources positive current to the load through a first transistor of the power stage during some periods and sinks negative current from the load through a second transistor of the power stage during other periods. The protection circuit is operable to force the second transistor into an off-state state responsive to the negative current flowing through the inductor exceeding a predetermined negative threshold.

According to an embodiment of a method of current limit protection for a multi-phase switching regulator including a power stage with a plurality of phases, each phase having a high-side transistor and a low-side transistor coupled to a load through an inductor, the method comprises: switching the phases of the power stage under control of a pulse width modulation controller so that the power stage sources positive current to the load through one or more of the high-side transistors during some periods and sinks negative current from the load through one or more of the low-side transistors during other periods; and forcing the pulse width modulation controller to switch off each low-side transistor responsive to the negative current flowing through one or more of the inductors exceeding a predetermined negative threshold.

According to an embodiment of a multi-phase switching regulator, the multi-phase switching regulator comprises a power stage including a plurality of phases, a pulse width modulation controller and a current monitoring circuit. Each phase of the power stage has a high-side transistor and a low-side transistor for coupling to a load through an inductor. The pulse width modulation controller is operable to switch the phases of the power stage so that the power stage sources positive current to the load through one or more of the high-side transistors during some periods and sinks negative current from the load through one or more of the low-side transistors during other periods. The protection circuit is operable to force the pulse width modulation controller to switch off one or more of the low-side transistors responsive to the negative current flowing through one or more of the inductors exceeding a predetermined negative threshold.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide negative current limit protection for switching regulators by forcing the power stage of the regulator to enter a switch state in which the negative current does not exceed a predetermined limit. The negative current limit protection techniques described herein can be applied to any switching regulator architecture, including: buck; boost; buck-boost; flyback; push-pull; half-bridge; full-bridge; and SEPIC (single-ended primary-inductor converter). A buck converter generates an output DC voltage that is lower than the input DC voltage. A boost converter generates an output voltage that is higher than the input. A buck-boost converter generates an output voltage opposite in polarity to the input. A flyback converter generates an output voltage that is less than or greater than the input, as well as multiple outputs. A push-pull converter is a two-transistor converter especially efficient at low input voltages. A half-bridge converter is a two-transistor converter used in many off-line applications. A full-bridge converter is a four-transistor converter usually used in off-line designs that can generate very high output power. A SEPIC is a type of DC-DC converter allowing the electrical voltage at its output to be greater than, less than, or equal to that at its input.

For each type of switching regulator architecture, robust operation is provided by supporting both positive and negative current operation i.e. the power stage of the regulator can sink (negative) current from the load and source (positive) current to the load. To ensure safe operation under negative current conditions, the negative current limit protection circuitry in the switching regulator ensures the negative current is maintained below an acceptable limit above which failure of the regulator power stage may occur.

Described next are embodiments of the negative current limit protection technique, explained in the context of a multi-phase switched mode buck converter where the negative current limit protection is provided for each phase of the regulator. Those skilled in the art will appreciate that the negative current limit protection embodiments described herein can be readily applied to other switching regulator architectures with minor modifications, if any. Such modifications are well within the capability of one of ordinary skill in the art, without requiring undue experimentation. For example, the negative current limit protection embodiments described herein can be readily applied to a single-phase buck converter regulator in the same way as a multi-phase buck converter. In the multi-phase buck converter case, negative current extremes may be more prevalent and therefore greater imbalances may be present across the phases as compared to the single-phase buck converter. In each case, the negative current limit protection technique protects the single phase or the multiple phases from excessive negative current conditions.

Figure 1:
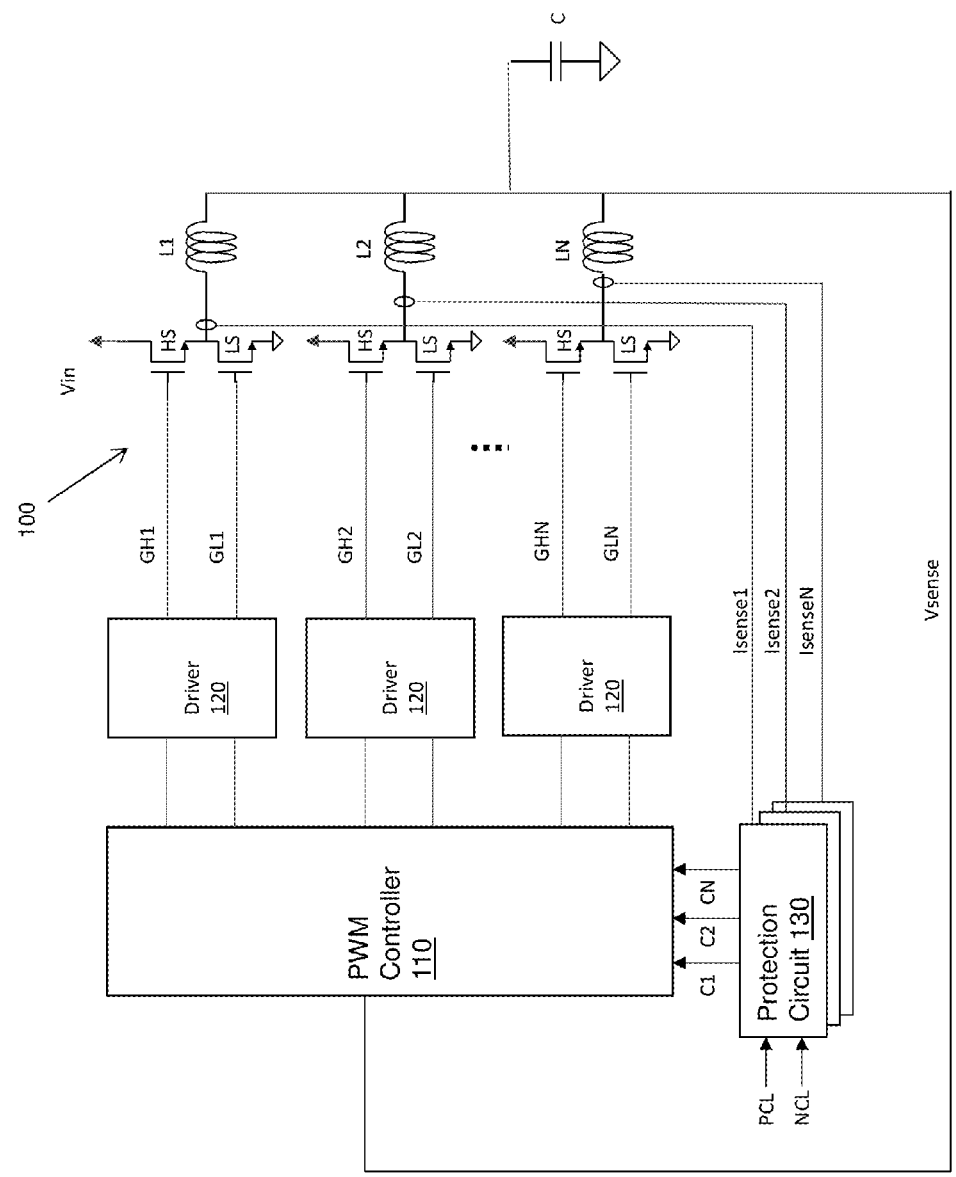
FIG. 1 illustrates a block diagram of a switching regulator having negative current limit protection.

FIG. 1 illustrates an embodiment of a multi-phase switching regulator comprising a power stage 100 including a plurality of phases. Each phase has a high-side transistor (HS) and a low-side transistor (LS) for coupling to a load (C) through an inductor (L). The high-side transistor of each phase switchably connects the load to an input voltage (Vin) and the corresponding low-side transistor switchably connects the load to ground at different periods. There are three phases shown in FIG. 1 (N=3), however any number of phases may be provided. Alternatively, only a single phase may be provided by omitting phases 2 through N.

In each case, a pulse width modulation (PWM) controller 110 switches the phases of the power stage 100 so that the power stage 100 sources positive current to the load through one or more of the high-side transistors during some periods and sinks negative current from the load through one or more of the low-side transistors during other periods. That is, the switching regulator operates in a continuous conduction mode (CCM) with current sinking capability. Only the first phase (N=1) may be active at times e.g. during light load conditions. One or more additional phases (N=2 or greater) can be activated to support greater power demands by the load. To this end, the PWM controller 110 provides control signals to a driver 120 connected to each phase of the power stage 100. The drivers 120 provide gate drive signals (GHN, GLN) to the gates of the high-side and low-side transistors of the corresponding phase, in response to the signals provided by the PWM controller 110. The activation state of the phases and the duty cycle of the high-side and low-side transistors are determined at least in part based on the output voltage (Vsense) applied to the load so that the regulator can react as quickly and reliably as possible to changing load conditions.

The power stage 100 both sources (positive) current to the load and sinks (negative) current from the load. For example, the power stage 100 may sink current when the output voltage changes very rapidly. Under such conditions, the load capacitance is discharged and the energy returned to the power stage 100. Also, a fault may occur which can damage a sensitive load such as a microprocessor, graphics processor, network processor, or digital signal processor if unmitigated. Rather than damage the load, the negative current caused by the fault is returned to the power stage 100 instead of being absorbed by the load. Negative current conditions may also arise during a transient load release, dynamic voltage changes, parallel operation of multiple load modules and shutdown of the load. In general under negative current conditions, the high-side transistors of the power stage 100 are normally switched off (i.e. non-conducting) by the PWM controller 110 and the low-side transistors are normally switched on (i.e. non-conducting) to sink the negative current to ground.

The power stage 100 current handling capability is not symmetrical, in particular the positive sourcing current capability of the power stage 100 typically far exceeds the negative sinking current capability. For example in a buck converter, large negative current may be a problem when the low-side transistor is switched off and current is forced to flow through the body diode of the high-side transistor. The current handling capability of the high-side transistor body diode is typically low e.g. because of smaller size relative to the low-side transistor and the floating nature of the high-side transistor (e.g. no terminal is grounded).

To prevent excessive negative current in the power stage 100, the switching regulator includes a protection circuit 130 for ensuring the negative current flowing through one or more of the output inductors does not exceed a predetermined negative current threshold (denoted NCL in FIG. 1). This way, the regulator system benefits from a certain amount of negative current capability without exposing the system to catastrophic failure resulting from excessive negative current. A single protection circuit 130 can be provided for all phases of the power stage 100, or a different protection circuit 130 can be provided for each phase.

Figure 2:
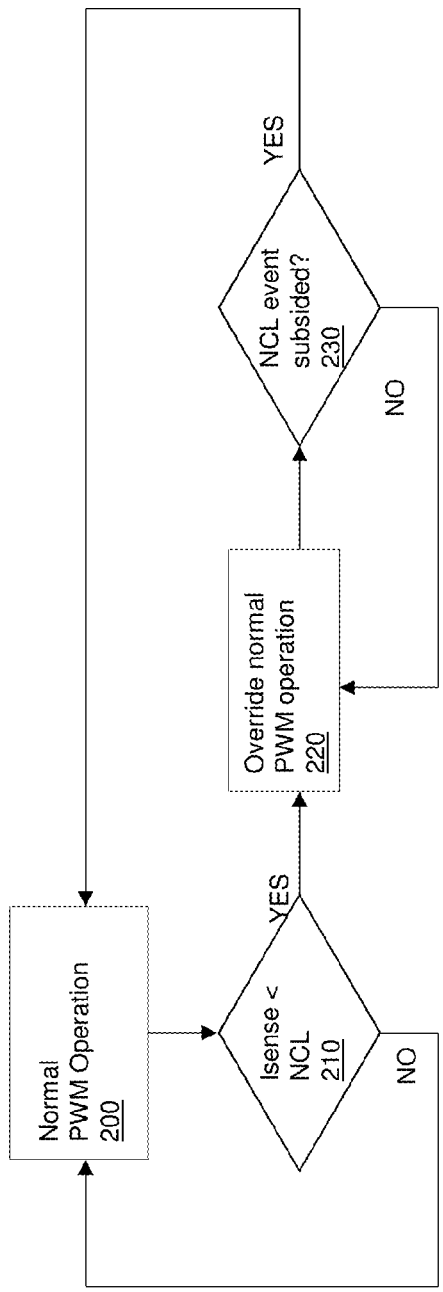
FIG. 2 illustrates a flow diagram of an embodiment of negative current limit protection for switching regulators.

FIG. 2 illustrates an embodiment of a method of implementing negative current limit protection by the protection circuit 130. During normal operation (200), the PWM controller 110 controls each phase of the power stage 100 to meet the power demand of the load. This includes providing both positive (sourcing) and negative (sinking) current operation during different periods. During negative current operation, the protection circuit 130 determines whether the negative current (Isense) flowing through one or more of the output inductors of the regulator exceeds a predetermined negative current threshold NCL (210). If the negative current does not exceed the threshold (i.e. the negative current has a smaller magnitude than the threshold), normal PWM operation continues. However if the negative current does exceed the threshold, the protection circuit 130 overrides normal PWM operation by forcing the PWM controller 110 to switch off one or more of the low-side transistors (220). Doing so prevents the magnitude of the negative current from increasing further.

The protection circuit 130 provides control signals (C1, C2, . . . CN) to the PWM controller 110 for overriding the PWM controller 110 in the event of excessive negative current. In one embodiment, the protection circuit 130 forces the PWM controller 110 to switch on one or more of the high-side transistors of the power stage 100 when the negative current exceeds the threshold so that the negative current is sunk by each switched-on high-side transistor instead of the low-side transistors. In another embodiment, the protection circuit 130 forces the PWM controller 110 to maintain one or more of the high-side transistors in the off-state so that the negative current is sunk by a body diode of each high-side transistor in the off-state instead of the corresponding low-side transistor. In each case, the protection circuit 130 prevents the negative current from further building up when the threshold is exceeded while safely sinking the existing negative current through the high-side of the power stage 100.

The protection circuit 130 permits the PWM controller 110 to resume full control of the power stage 100 (i.e. normal PWM operation) after the negative current limit event subsides (230). In one embodiment, the protection circuit 130 determines the negative current limit event likely subsided after a predetermined amount of time lapses from when the negative current was determined to exceed the threshold. For example, the protection circuit 130 can set a timer when a negative current limit event is detected and presume the event has subsided when the timer expires. In another embodiment, the protection circuit 130 permits the PWM controller 110 to resume normal PWM operation at a designated point in time during the PWM period immediately following the PWM period during which the negative current was determined to exceed the threshold. For example, the PWM controller 110 can resume normal PWM operation when the PWM control signal changes from high to low or low to high, or at a point in between the transitions e.g. halfway between transitions. In yet another embodiment, the protection circuit 130 permits the PWM controller 110 to resume normal PWM operation responsive to the negative current decreasing below a second predetermined negative threshold having a smaller magnitude than the first threshold e.g. as shown in FIG. 3.

Figure 3:
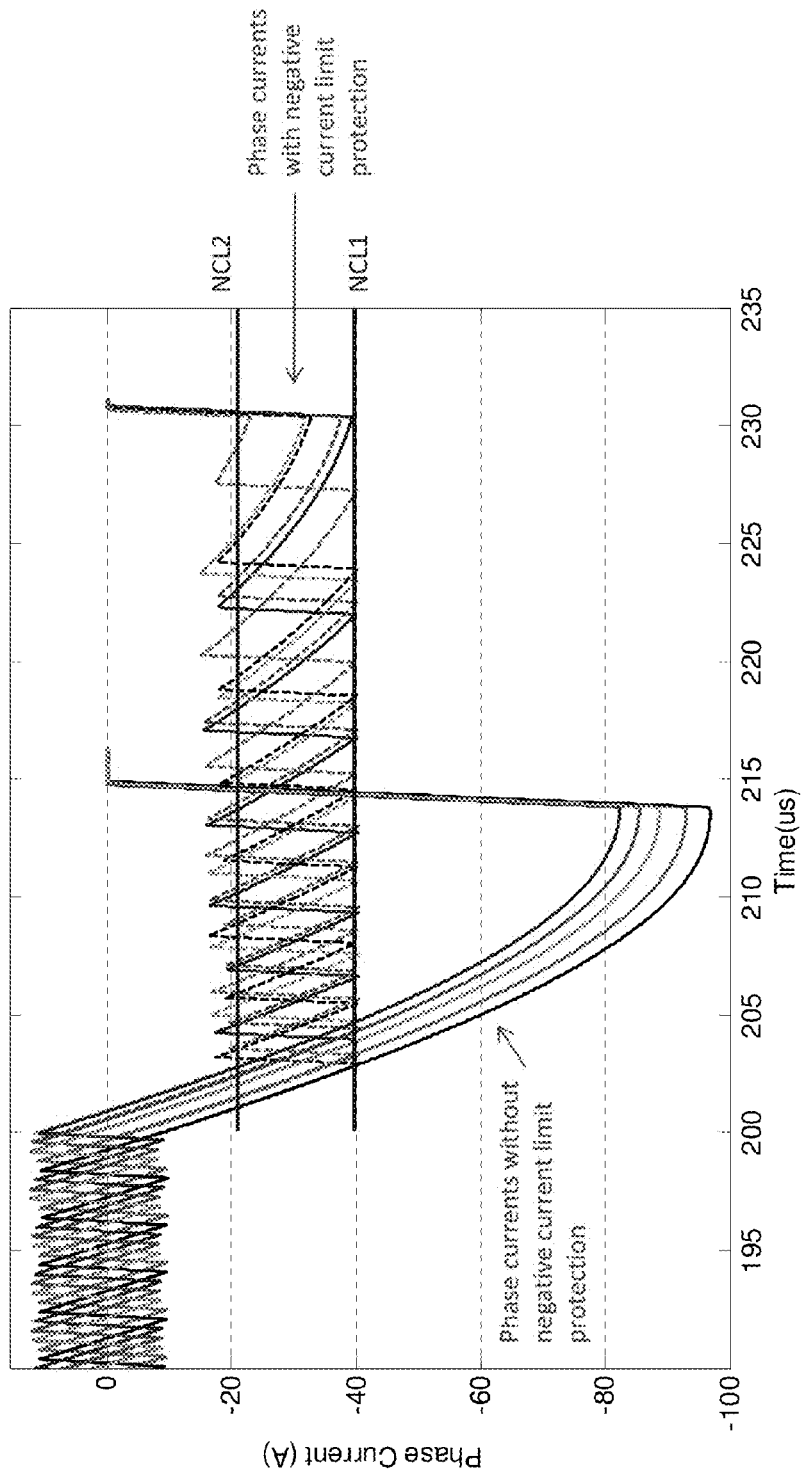
FIG. 3 illustrates a plot diagram comparing operation of a switching regulator with and without negative current limit protection according to an embodiment.

FIG. 3 plots the current for the three phases of the exemplary multi-phase switching regulator. During the first 200 μs, the switching regulator operates in a positive current mode i.e. the power stage 100 sources current to the load through one or more of the high-side transistors. A condition occurs which causes a negative current event to occur i.e. the power stage 100 begins to sink current from the load through one or more of the low-side transistors. The protection circuit 130 overrides the PWM controller 110 via the control signals (C1, C2, . . . , CN) provided to the PWM controller 110 when the negative current (Isense) through one or more of the output inductors exceeds a predetermined negative current threshold (NCL1). In response, the protection circuit 130 forces the PWM controller 110 to switch off the low-side transistors of the power stage 100 and either switch on one or more of the high-side transistors to sink the negative current or maintain all high-side transistors in an off state so that the body diodes of the high-side transistors sink the negative current. In either case, the protection circuit 130 prevents the negative current from exceeding the lower threshold.

In FIG. 3, the lower threshold is shown as −40 A for illustrative purposes only. The low-side transistors remain switched off until the negative current decreases below a lower predetermined negative threshold (NCL2). In FIG. 3, the lower threshold is shown as −20 A for illustrative purposes only. The PWM controller 110 is permitted to resume full control of the power stage 100 when the negative current decreases below the lower threshold. This may include continued negative current operation as shown in FIG. 3.

The protection circuit 130 overrides the PWM controller 110 each time the negative current exceeds the larger threshold (NCL1) and permits the PWM controller 110 to resume full control of the power stage 100 when the negative current decreases below the lower threshold (NCL2). The choice of thresholds may depend on several factors, and various threshold bounds are within the contemplation of the inventors. In each case, the negative current sunk by the power stage 100 is prevented from becoming too large. The phase currents without negative current limit protection are also shown in FIG. 3 for comparison purposes. The negative current is handled quicker without negative current protection, but with the real risk of destroying the high-side transistors of the power stage 100 due to overly large negative current.

Figure 4:
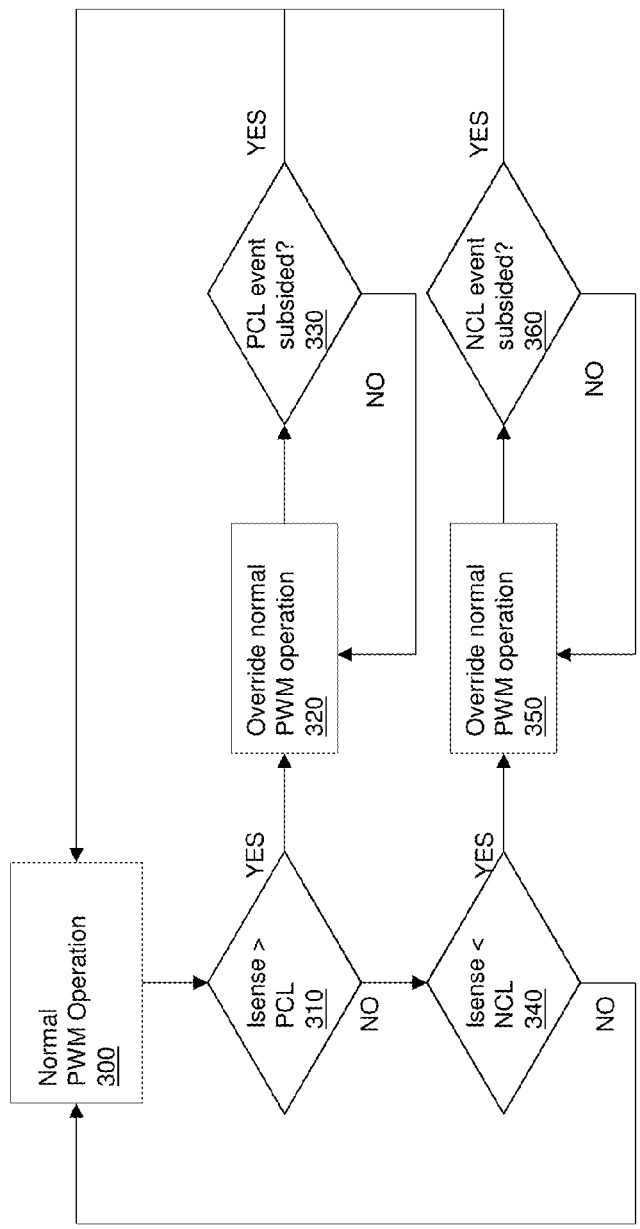
FIG. 4 illustrates a flow diagram of an embodiment of positive and negative current limit protection for switching regulators.

FIG. 4 illustrates an embodiment of a method of implementing both positive and negative current limit protection by the protection circuit 130. During normal operation (300), the PWM controller 110 controls each phase of the power stage 100 to meet the power demand of the load. This includes providing both positive (sourcing) and negative (sinking) current operation. During positive current operation, the protection circuit 130 determines whether the positive current (Isense) flowing through one or more of the output inductors of the regulator exceeds a predetermined positive current threshold PCL (310). If the positive current exceeds the threshold, the protection circuit 130 overrides normal PWM operation by forcing the PWM controller 110 to switch off one or more of the high-side transistors and switch on one or more of the low-side transistors (320). Doing so prevents the positive current from increasing further. The protection circuit 130 permits the PWM controller 110 to resume full control of the power stage 100 (i.e. normal PWM operation) after the positive current limit event subsides (330). Otherwise, the protection circuit 130 continues to override the PWM controller 110 during the positive current limit event.

During negative current operation, the protection circuit 130 determines whether the negative current (Isense) flowing through one or more of the output inductors of the regulator exceeds a negative current threshold NCL (340). If the negative current does not exceed the threshold (i.e. the negative current has a smaller magnitude than the threshold), normal PWM operation continues. However if the negative current does exceed the threshold, the protection circuit 130 overrides normal PWM operation (350) by forcing the PWM controller 110 to switch off one or more of the low-side transistors to prevent a further increase in the magnitude of the negative current and sink the negative current through the high-side of the power stage 100 according to any of the embodiments as previously described herein. The protection circuit 130 permits the PWM controller 110 to resume full control of the power stage 100 after the negative current limit event subsides (360). Otherwise, the protection circuit 130 continues to override the PWM controller 110 during the negative current limit event.

Figure 5C:
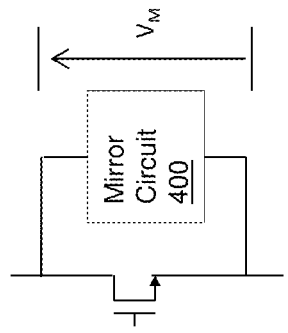
FIGS. 5A to 5C illustrate block diagrams of different embodiments of sense circuits for determining the negative current level of a switching regulator.
Figure 5B:
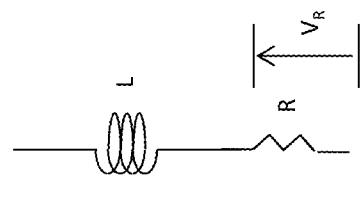
Figure 5A:
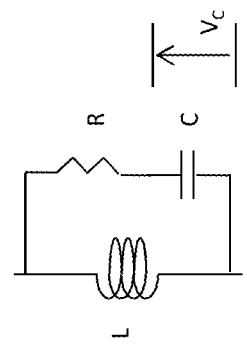

As shown in FIG. 1, the protection circuit 130 determines whether the negative and positive current limit thresholds are exceeded based on feedback information (Isense1, Isense2, . . . , IsenseN) representing the amount of current flowing through each inductor coupling a phase of the output stage 100 to the load. In one embodiment, a series connected resistor (R) and capacitor (C) are connected in parallel with each inductor (L) and the feedback information corresponds to the voltage ($V_C$) across the capacitor as shown in FIG. 5A. In another embodiment, a resistor is connected in series with each inductor and the feedback information corresponds to the voltage ($V_R$) across the resistor as shown in FIG. 5B. In yet another embodiment, a mirror circuit 400 is connected to the low-side or high-side transistor of each phase and the feedback information corresponds to the voltage ($V_M$) of the mirror circuit 400 as shown in FIG. 5C. In still another embodiment, the protection circuit 130 determines whether the negative current flowing through each phase inductor exceeds the predetermined negative threshold based on the switch state of the power stage 100 which can be provided by the PWM controller 110.

Figure 6:
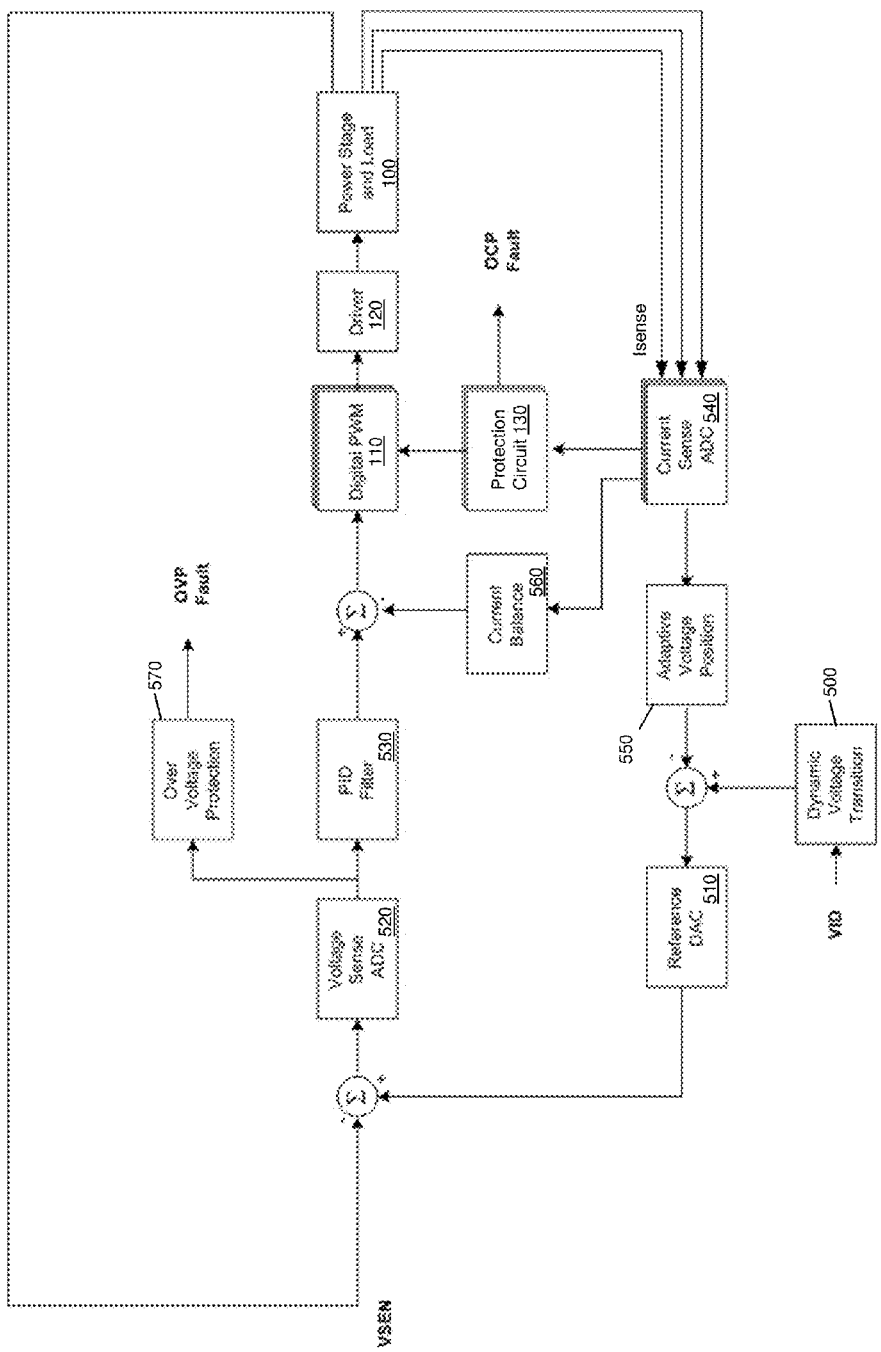
FIG. 6 illustrates a detailed block diagram of a switching regulator having negative current limit protection.

FIG. 6 illustrates an embodiment of a switching regulator with negative current limit protection. According to this embodiment, the PWM controller 110 uses a voltage sense input (VSEN) to measure the output voltage and a voltage identification (VID) to set the regulator set-point i.e. the target voltage when the load current is zero. A dynamic voltage transition circuit 500 controls the change from one VID to another by ramping the target voltage. A reference DAC (digital to analog converter) 510 sets the target voltage for the regulator as an analog reference voltage to which VSEN is compared. A voltage sense ADC (analog to digital converter) 520 converts the error voltage i.e. the difference between the target voltage and the voltage sense, into a digital representation. A PID (proportional-integral-derivative) filter 530 implements a compensator transfer function with the error voltage as an input and duty cycle as the output. The PWM controller 110 converts the digital duty cycle representation into a pulse width modulated waveform that interfaces with the driver 120 to control the switch state of the power stage 100. A current sense ADC 540 converts the current sense inputs into phase current information. An adaptive voltage position circuit 550 converts the phase current information into an offset from the set-point to set the regulator target voltage based on the load current. A current balance circuit 560 converts the phase current information into adjustments to the duty cycle of each individual phase to adjust the phase currents so they remain balanced. The protection circuit 130 monitors the phase currents and can force the PWM controller 110 to modify the PWM pulses to ensure that the phase current does not exceed a positive or negative limit as previously described herein. In addition, the protection circuit 130 can also provide over current protection (OCP) by shutting down the regulator if regulator operation cannot be maintained without exceeding some other positive or negative limit. An over voltage protection (OVP) circuit 570 monitors the output voltage to ensure that the output voltage is within some reasonable bound of operation. The OVP circuit 570 can also shut down the regulator if regulator operation cannot be maintained without exceeding some limit.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of current limit protection for a switching regulator, the method comprising:
   switching a power stage coupled to a load through an inductor so that the power stage sources positive current to the load through a first transistor of the power stage during some periods and sinks negative current from the load through a second transistor of the power stage during other periods; and
   forcing the second transistor into an off-state state responsive to the negative current flowing through the inductor exceeding a first predetermined negative threshold,
   wherein operation of the power stage is controlled by a pulse width modulation controller,
   wherein control of the power stage by the pulse width modulation controller is overridden responsive to the negative current flowing through the inductor exceeding the first predetermined negative threshold.

2. The method according to claim 1, further comprising switching on the first transistor responsive to the negative current flowing through the inductor exceeding the first predetermined negative threshold so that the first transistor sinks the negative current instead of the second transistor.

3. The method according to claim 1, further comprising maintaining the first transistor in the off-state responsive to the negative current flowing through the inductor exceeding the first predetermined negative threshold so that a body diode of the first transistor sinks the negative current instead of the second transistor.

4. The method according to claim 1, further comprising permitting the pulse width modulation controller to resume full control of the power stage responsive to a predetermined amount of time lapsing after the negative current flowing through the inductor was determined to exceed the first predetermined negative threshold.

5. The method according to claim 1, further comprising permitting the pulse width modulation controller to resume full control of the power stage at a designated point in time during a pulse width modulation period immediately following the period during which the negative current flowing through the inductor was determined to exceed the first predetermined negative threshold.

6. The method according to claim 1, further comprising permitting the pulse width modulation controller to resume full control of the power stage responsive to the negative current flowing through the inductor decreasing below a second predetermined negative threshold having a smaller magnitude than the first predetermined negative threshold.

7. The method according to claim 1, further comprising forcing the first transistor into an off-state state responsive to the positive current flowing through the inductor exceeding a predetermined positive threshold.

8. A switching regulator, comprising:
   a power stage for coupling to a load through an inductor, the power stage operable to switch so that the power stage sources positive current to the load through a first transistor of the power stage during some periods and sinks negative current from the load through a second transistor of the power stage during other periods;
   a pulse width modulation controller operable to control operation of the power stage; and
   a protection circuit operable to override control of the power stage by the pulse width modulation controller responsive to the negative current flowing through the inductor exceeding a first predetermined negative threshold, so as to force the second transistor into an off-state state if the negative current flowing through the inductor exceeds the first predetermined negative threshold.

9. The switching regulator according to claim 8, wherein the protection circuit is operable to switch on the first transistor responsive to the negative current flowing through the inductor exceeding the first predetermined negative threshold so that the first transistor sinks the negative current instead of the second transistor.

10. The switching regulator according to claim 8, wherein the protection circuit is operable to maintain the first transistor in the off-state responsive to the negative current flowing through the inductor exceeding the first predetermined negative threshold so that a body diode of the first transistor sinks the negative current instead of the second transistor.

11. The switching regulator according to claim 8, wherein the protection circuit is operable to permit the pulse width modulation controller to resume full control of the power stage responsive to a predetermined amount of time lapsing after the negative current flowing through the inductor was determined to exceed the first predetermined negative threshold.

12. The switching regulator according to claim 8, wherein the protection circuit is operable to permit the pulse width modulation controller to resume full control of the power stage at a designated point in time during a pulse width modulation period immediately following the period during which the negative current flowing through the inductor was determined to exceed the first predetermined negative threshold.

13. The switching regulator according to claim 8, wherein the protection circuit is operable to permit the pulse width modulation controller to resume full control of the power stage responsive to the negative current flowing through the inductor decreasing below a second predetermined negative threshold having a smaller magnitude than the first predetermined negative threshold.

14. The switching regulator according to claim 8, wherein the protection circuit is further operable to determine whether the negative current flowing through the inductor exceeds the first predetermined negative threshold based on a voltage across a capacitor in series with a resistor, the capacitor and resistor connected in parallel with the inductor.

15. The switching regulator according to claim 8, wherein the protection circuit is further operable to determine whether the negative current flowing through the inductor exceeds the first predetermined negative threshold based on a voltage across a resistor connected in series with the inductor.

16. The switching regulator according to claim 8, wherein the protection circuit is further operable to determine whether the negative current flowing through the inductor exceeds the first predetermined negative threshold based on a voltage of a mirror circuit connected to the first or second transistor.

17. The switching regulator according to claim 8, wherein the protection circuit is further operable to determine whether the negative current flowing through the inductor exceeds the first predetermined negative threshold based on a switch state of the power stage.

18. A method of current limit protection for a multi-phase switching regulator including a power stage with a plurality of phases, each phase having a high-side transistor and a low-side transistor coupled to a load through an inductor, the method comprising:
switching the phases of the power stage under control of a pulse width modulation controller so that the power stage sources positive current to the load through one or more of the high-side transistors during some periods and sinks negative current from the load through one or more of the low-side transistors during other periods;
forcing the pulse width modulation controller to switch off one or more of the low-side transistors responsive to the negative current flowing through one or more of the inductors exceeding a first predetermined negative threshold; and
switching on one or more of the high-side transistors responsive to the negative current exceeding the first predetermined negative threshold so that the one or more switched on high-side transistors sink the negative current instead of the low-side transistors, or maintaining one or more of the high-side transistors in the off-state responsive to the negative current exceeding the first predetermined negative threshold so that a body diode of the one or more high-side transistors in the off-state sink the negative current instead of the corresponding low-side transistor.

19. The method according to claim 18, further comprising permitting the pulse width modulation controller to resume full control of the low-side transistors responsive to a predetermined amount of time lapsing after the negative current flowing through one or more of the inductors was determined to exceed the first predetermined negative threshold.

20. The method according to claim 18, further comprising permitting the pulse width modulation controller to resume full control of the low-side transistors at a designated point in time during a pulse width modulation period immediately following the period during which the negative current flowing through one or more of the inductors was determined to exceed the first predetermined negative threshold.

21. The method according to claim 18, further comprising permitting the pulse width modulation controller to resume full control of the low-side transistors responsive to the negative current flowing through one or more of the inductors decreasing below a second predetermined negative threshold having a smaller magnitude than the first predetermined negative threshold.

22. A multi-phase switching regulator, comprising:
a power stage including a plurality of phases, each phase having a high-side transistor and a low-side transistor for coupling to a load through an inductor;
a pulse width modulation controller operable to switch the phases of the power stage so that the power stage sources positive current to the load through one or more of the high-side transistors during some periods and sinks negative current from the load through one or more of the low-side transistors during other periods; and
one or more protection circuits operable to force the pulse width modulation controller to switch off one or more of the low-side transistors responsive to the negative current flowing through one or more of the inductors exceeding a first predetermined negative threshold,
wherein the one or more protection circuits are operable to force the pulse width modulation controller to switch on one or more of the high-side transistors responsive to the negative current flowing through one or more of the inductors exceeding the first predetermined negative threshold so that the one or more switched on high-side transistors sink the negative current instead of the low-side transistors, or force the pulse width modulation controller to maintain one or more of the high-side transistors in the off-state responsive to the negative current flowing through one or more of the inductors exceeding the first predetermined negative threshold so that a body diode of the one or more high-side transistors in the off-state sink the negative current instead of the corresponding low-side transistor.

23. The multi-phase switching regulator according to claim 22, wherein the one or more protection circuits are operable to permit the pulse width modulation controller to resume full control of the low-side transistors responsive to a predetermined amount of time lapsing after the negative current flowing through one or more of the inductors was determined to exceed the first predetermined negative threshold.

24. The multi-phase switching regulator according to claim 22, wherein the one or more protection circuits are operable to permit the pulse width modulation controller to resume full control of the low-side transistors at a designated point in time during a pulse width modulation period immediately following the period during which the negative current flowing through one or more of the inductors was determined to exceed the first predetermined negative threshold.

25. The multi-phase switching regulator according to claim 22, wherein the one or more protection circuits are operable to permit the pulse width modulation controller to resume full control of the low-side transistors responsive to the negative current flowing through one or more of the inductors decreasing below a second predetermined negative threshold having a smaller magnitude than the first predetermined negative threshold.

26. The multi-phase switching regulator according to claim 22, wherein the one or more protection circuits are further operable to force the pulse width modulation controller to switch off one or more of the high-side transistors into an off-state state responsive to the positive current flowing through one or more of the inductors exceeding a predetermined positive threshold.

27. A method of current limit protection for a switching regulator, the method comprising:
switching a power stage coupled to a load through an inductor so that the power stage sources positive current to the load through a first transistor of the power stage during some periods and sinks negative current from the load through a second transistor of the power stage during other periods; and
forcing the second transistor into an off-state state responsive to the negative current flowing through the inductor exceeding a first predetermined negative threshold, the first predetermined negative threshold being selected so that the second transistor of the power stage is permitted to sink negative current from the load until the negative current reaches the first predetermined negative threshold.

28. A switching regulator, comprising:
a power stage for coupling to a load through an inductor, the power stage operable to switch so that the power stage sources positive current to the load through a first transistor of the power stage during some periods and sinks negative current from the load through a second transistor of the power stage during other periods; and
a protection circuit operable to force the second transistor into an off-state state responsive to the negative current flowing through the inductor exceeding a first predetermined negative threshold, the first predetermined negative threshold being selected so that the second transistor of the power stage is permitted to sink negative current from the load until the negative current reaches the first predetermined negative threshold.

* * * * *